US012416378B1

(12) United States Patent
Sundaramurthy et al.

(10) Patent No.: US 12,416,378 B1
(45) Date of Patent: Sep. 16, 2025

(54) CONNECTOR WITH MOVABLE COLLAR FOR SELECTIVELY DISPLAYING INDICIA

(71) Applicant: Hutchinson Fluid Management Systems, Inc., Auburn Hills, MI (US)

(72) Inventors: Nithish Kumar Sundaramurthy, South Lyon, MI (US); Daniel Blondell, Sterling Heights, MI (US)

(73) Assignee: Hutchinson Fluid Management Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/606,334

(22) Filed: Mar. 15, 2024

(51) Int. Cl.
*F16L 37/086* (2006.01)

(52) U.S. Cl.
CPC ......... *F16L 37/086* (2013.01); *F16L 2201/10* (2013.01)

(58) Field of Classification Search
CPC ... F16L 2201/10; F16L 37/086; F16L 37/084; F16L 37/0841; F16L 37/0985; F16L 37/1225; F16L 37/138
USPC ..................................... 285/86, 93
See application file for complete search history.

(56) References Cited

U.S. PATENT DOCUMENTS

| | | | | |
|---|---|---|---|---|
| 3,039,794 | A * | 6/1962 | Herbert | F16L 37/1215 285/317 |
| 11,131,411 | B2 * | 9/2021 | Gaurat | F16L 37/0841 |
| 11,774,024 | B2 * | 10/2023 | Barthel | F16L 37/1225 285/93 |
| 2021/0396336 | A1 * | 12/2021 | Schröter | F16L 37/0841 |
| 2022/0163153 | A1 * | 5/2022 | Gauthier | F16L 37/1225 |
| 2024/0068610 | A1 * | 2/2024 | Hunt | F16L 37/0841 |
| 2025/0012389 | A1 * | 1/2025 | Hartmann | F16L 37/0847 |

FOREIGN PATENT DOCUMENTS

| | | |
|---|---|---|
| WO | 2023133605 A1 | 7/2023 |
| WO | 2024020611 A1 | 2/2024 |

OTHER PUBLICATIONS

Machine Translation of WO 2024/020611 dated Feb. 1, 2024 (12 pages).
Machine Translation of WO 2023/133605 dated Jul. 20, 2023 (11 pages).

* cited by examiner

*Primary Examiner* — David Bochna
(74) *Attorney, Agent, or Firm* — Gunther J. Evanina; BUTZEL LONG

(57) ABSTRACT

A female quick connector member for making fluid-tight connections includes a body having indicia and an axial opening for receiving and lockingly engaging a male quick connector member, a collar positioned over the body, a latch for holding the collar in a first position that conceals the indicia prior to coupling of the male and female connector members, a spring for urging the collar to a second position in which the indicia is fully exposed when the latch is released, a release member engageable by the male connector member and configured to release the latch when the male connector member is lockingly engaged with the female connector body.

12 Claims, 3 Drawing Sheets

CONNECTOR WITH MOVABLE COLLAR FOR SELECTIVELY DISPLAYING INDICIA

FIELD OF THE DISCLOSURE

This disclosure generally relates to quick connector couplings providing fluid-tight connections in pipe and tubing fluid conduit systems, and more particularly to quick connector couplings that include means for displaying indicia around the connector in multiple places providing a visual indication for a fluid-tight connection that has been completed between quick connector members.

BACKGROUND OF THE DISCLOSURE

There is a recognized need for providing connection verification indicating a fluid tight connection between a male quick connector member and a female quick connector member. Relatively simple mechanism for accomplishing this task have involved verification indicia that become viewable through a window or cutout in one of the connector members when a fluid tight connection has been achieved. A disadvantage with such verification mechanism is the need for proper alignment between the connector members to allow obstruction-free viewing of the indicia. Such disadvantage can be overcome by providing keyed or splined connector members that only allow aligned assembly. However, such alignment features make assembly more difficult.

It is desirable to provide a verification mechanism that exposes indicia on the female quick connector member without regard to angular alignment of the connector member around an axis coincident with the direction of insertion of the male connector member into the female connector member and exposing the indicia in multiple areas around/across the surface of the female connector.

SUMMARY OF THE DISCLOSURE

The disclosed female quick connector member includes a body having indicia on an outer surface thereof and an axial opening for receiving and lockingly engaging a male quick connector member, a collar positioned over and axially movable along the body of the female quick connector member, a latch for holding the collar in a first position that conceals the indicia, a spring for urging the collar to a second position in which the indicia is fully exposed when the latch is released, and a release member engageable by a male connector member inserted into the axial opening and configured to release the latch when a male connector member is lockingly engaged with the female connector body, whereby the spring urges the collar to the second position fully exposing the indicia.

In certain embodiments, the latch is a cantilevered section of the collar having a projecting detent that can engage a radial opening through the wall of the female connector body to hold the collar in the first position before insertion of the male connector member.

In certain other embodiments, the female connector member may further comprise a retainer that resiliently deforms radially upon insertion of a male connector member and that holds the male connector member and female connector member together after complete insertion.

In certain embodiments, the release member is a pin extending through a radial opening in the wall of the female connector body. The pin has a proximal end projecting into the axial opening of the female connector body and a distal end engageable with the latch, whereby complete insertion of the male connector member causes engagement with the pin and release of the latch to allow the spring to urge the collar into the second position in which the indicia are exposed.

In certain embodiments, when the collar is in the second position to expose the indicia, the projecting detent of the cantilever section engages on top of the retainer enclosing it completely, thereby preventing the retainer from reopening, providing a secondary lock on the already connected male and female connector members.

DETAILED DESCRIPTION

Figure 1:
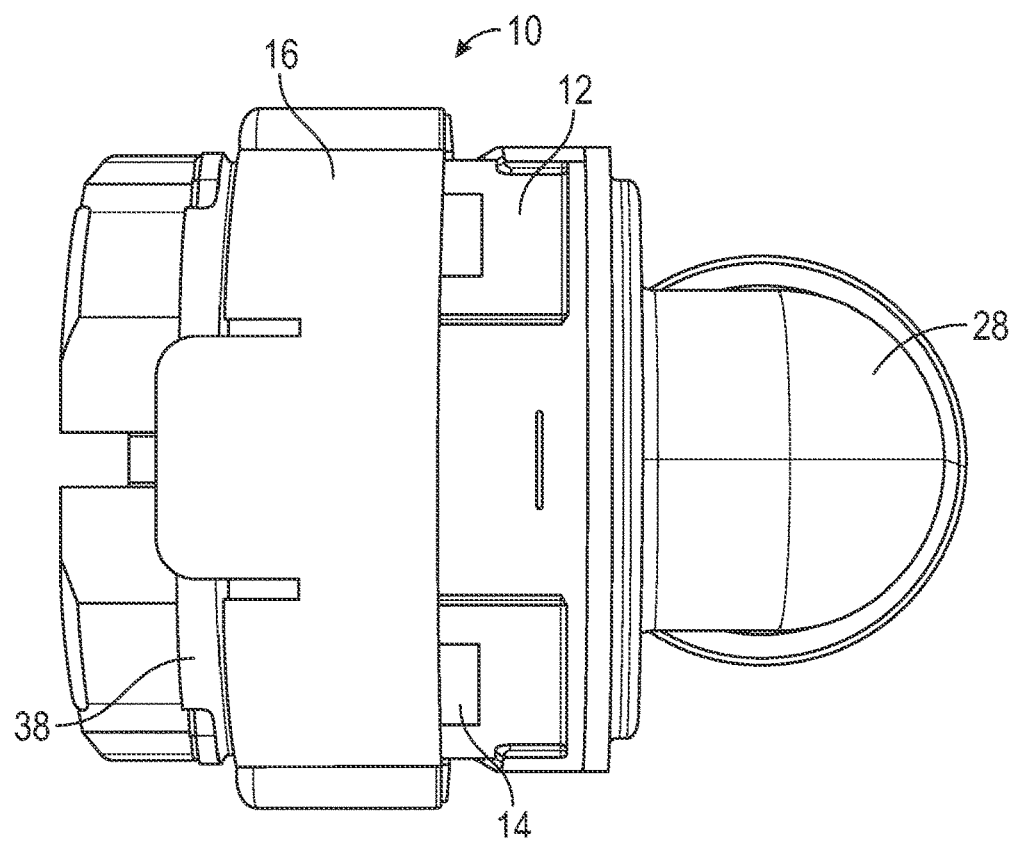
FIG. 1 is a side view of a female quick connector member in accordance with this disclosure.
Figure 2:
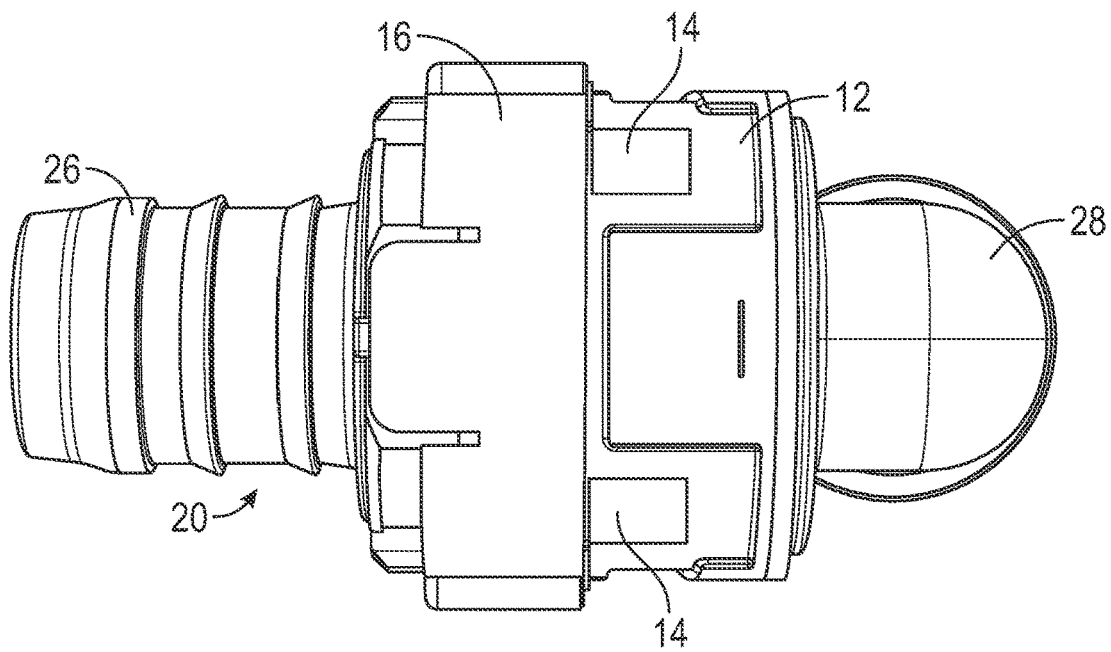
FIG. 2 is a side view of the female quick connector member shown in FIG. 1 fully connected with a male quick connector member.
Figure 3:
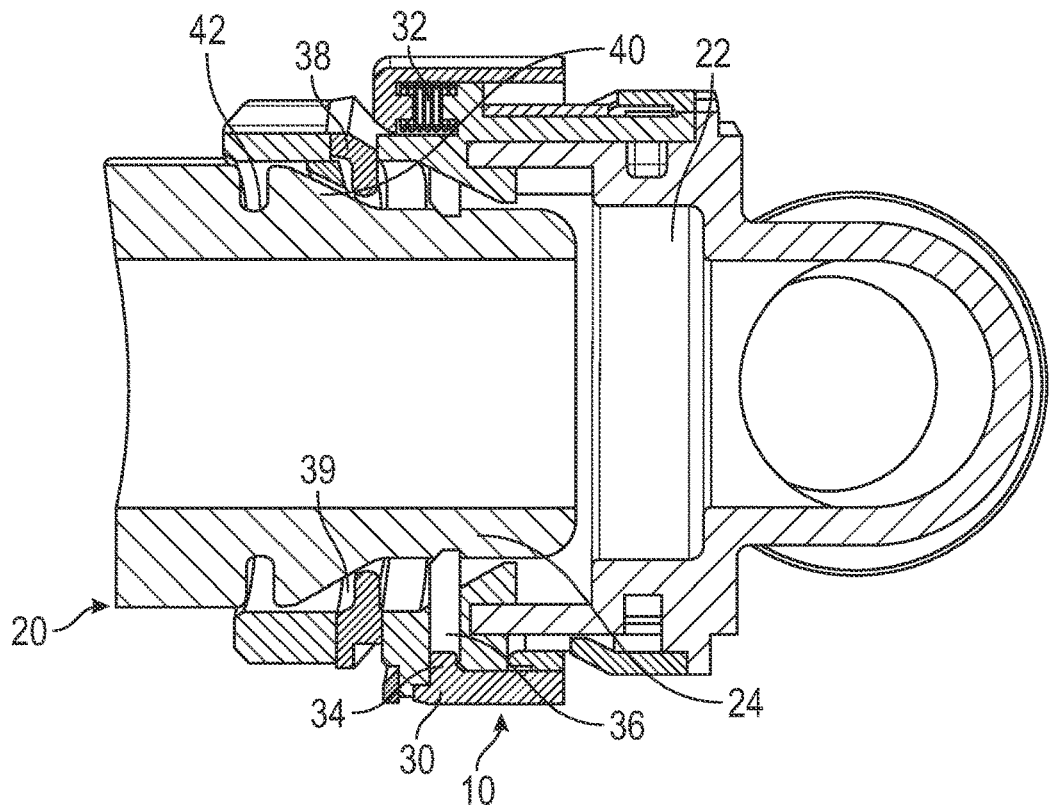
FIG. 3 is a cross-sectional view of the male quick connector member partially inserted into the female quick connector member along a cutting plane including the axis.

Shown in FIG. 1 is a female quick connector member 10 having a body 12. Indicia 14 is provided on an outer surface of a wall of body 12 in multiple areas. Indicia 14 is fully, or at least partially covered by a collar 16 (as shown in FIG. 1) before connection with a male quick connector member 20 (FIG. 2). As shown in FIG. 3, female connector member 10 has an axial opening 22 for receiving an end 24 of male connector member 20. Collar 16 can be fit over the outer surface of body 12.

A first fluid conduit means such as a tube or pipe (not shown) is connected to the exposed end 26 of male connector member 20, and a second fluid conduit means, which may be the same as or different from the first fluid conduit means, is connected to the end 28 of female connector member 10. Typically, the conduit means are connected to the respective connector members before the connector members are joined to each other.

A latch 30 is provided to hold collar 16 in a first position that conceals at least a portion of indicia 14 prior to joining of the male connector member 20 to the female connector member 10. Latch 30 can be any device that locks collar 16 in the first position until male connector member 20 is fully inserted into axial opening 22, and then, after full insertion, releases collar 16, allowing it to be urged into a second position relative to body 12 by a spring 32, whereby indicia 14 is fully exposed (as show in FIG. 2).

In the illustrated embodiments of FIGS. 1 through 4, the latch 30 is a cantilevered section of collar 16 having a protruding catch or detent 34 that is resiliently biased into engagement with a radial opening extending through the wall of body 12. A portion of the radial opening is occupied by detent 34 prior to connecting the female and male connectors together. The remaining portion of the radial opening is occupied by a release member or pin 36 that extends from detent 34 into opening 22. During assembly of the quick connection, as male member 20 nears full insertion into axial opening 22, an outer wall of member 20 contacts a proximal end of pin 36 opposite the distal end that is engaging detent 34, and upon full insertion of member 20, pin 36 and detent 34 are urged in a radially outward direction, unlocking collar 16 from body 12 and allowing spring 32 to force collar 16 to move from the first position (FIGS. 1 and 3) to the second position (FIGS. 2 and 4) in which indicia 14 are fully exposed.

While collar 16 can be locked into a first position that partially exposes indicia 14, it is desirable that a portion of indicia 14 is concealed in the first position to prevent reading of the indicia by a machine or human, and only upon full insertion of the member 20 and complete connection between members 10 and 20 is indicia 14 readable.

Indicia 14 may include human readable characters such as letters, numbers, color, and/or symbols. Indicia 14 may include only machine-readable codes such as QR codes, bar codes or the like. Indicia 14 may include combinations of machine-readable codes, human readable characters, and color codes. Such indicia may be applied to body 12 as pre-printed stickers, or they can be laser etched, printed, painted, engraved, embossed, molded into, or otherwise applied. Multiple indicia can be circumferentially spaced apart along the outer surface of body 12 to allow machine readability from any angle or perspective.

Spring 32 can be a coil spring, a helical spring, a leaf spring, a wave spring, or the like, made of a resiliently deformable metal (e.g., stainless steel) or other elastic material.

A preferred embodiment includes two latches. However, generally any number of latches and associated release members may be used. Similarly, while a preferred embodiment includes four (4) uniformly angularly spaced apart springs, any number of springs may be used.

Figure 4:
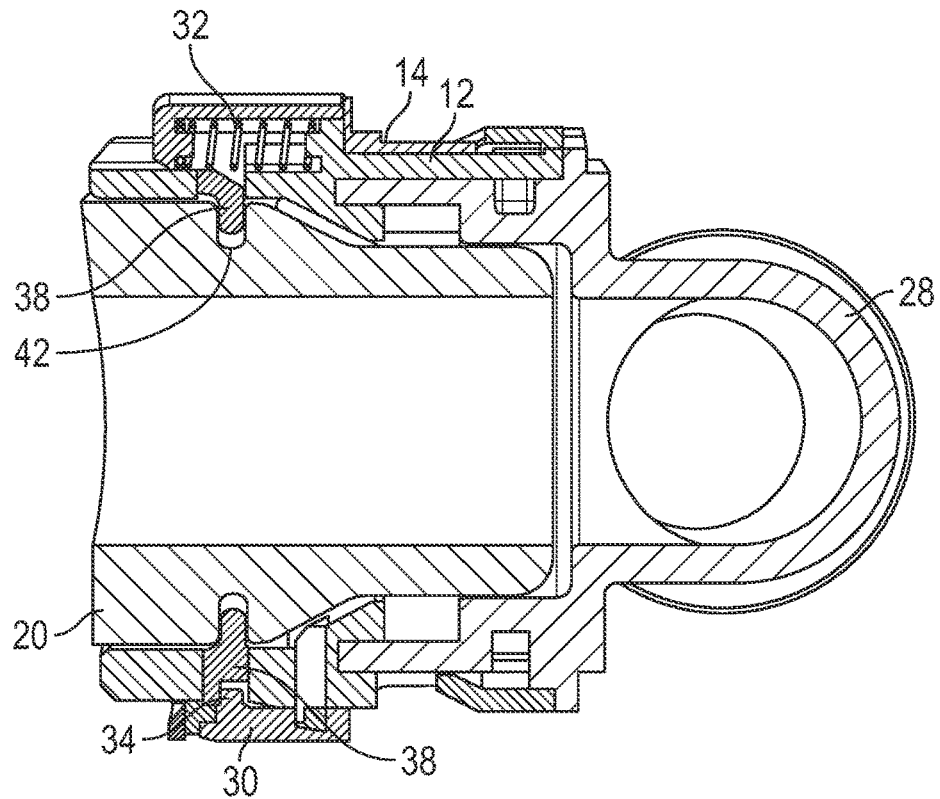
FIG. 4 is a cross-sectional view of the male quick connector member fully inserted into the female quick connector member along a cutting plane including the axis.

A metal or plastic retainer 38 can be provided in a slot 39 of member 10 to help hold male connector member 20 and female connector member 10 together after complete insertion of the member 20 into member 10. Retainer 38 is radially deformed outwardly by an outwardly facing ramped surface 40 of an enlarged (e.g., frustoconical) section (FIG. 3) of male connector member 20 during insertion of member 20 into axial opening 22 (FIG. 4). Upon full insertion of male connector member 20 into axial opening 22, retainer 38 rebounds into a groove 42, defined by the male connector member, helping to lock the members 10 and 20 together.

As shown in FIG. 4, latch 30 can be configured to cover and engage retainer 38 to provide a secondary lock for holding collar 16 in the second position to maintain exposure of indicia 14.

Figure 5:
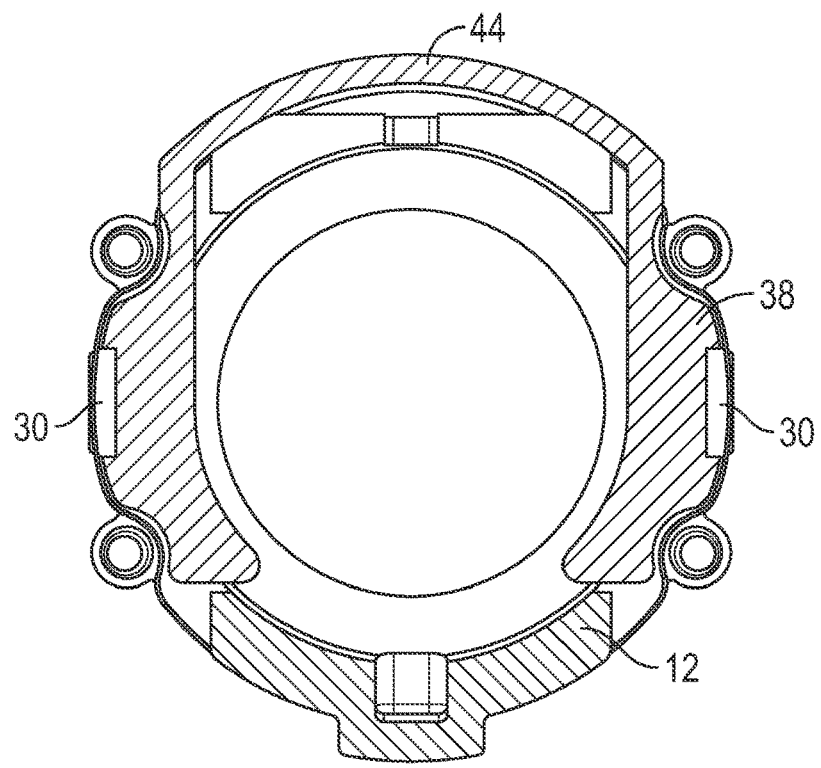
FIG. 5 is a cross-sectional view of a coupled male-female assembly employing a plastic retainer along a cutting plane perpendicular to the axis.

As shown in FIG. 5, retainer 38 has an outwardly projecting yoke 44 to which pressure can be applied to release latches 30 to facilitate separation of members 10 and 20.

Figure 6:
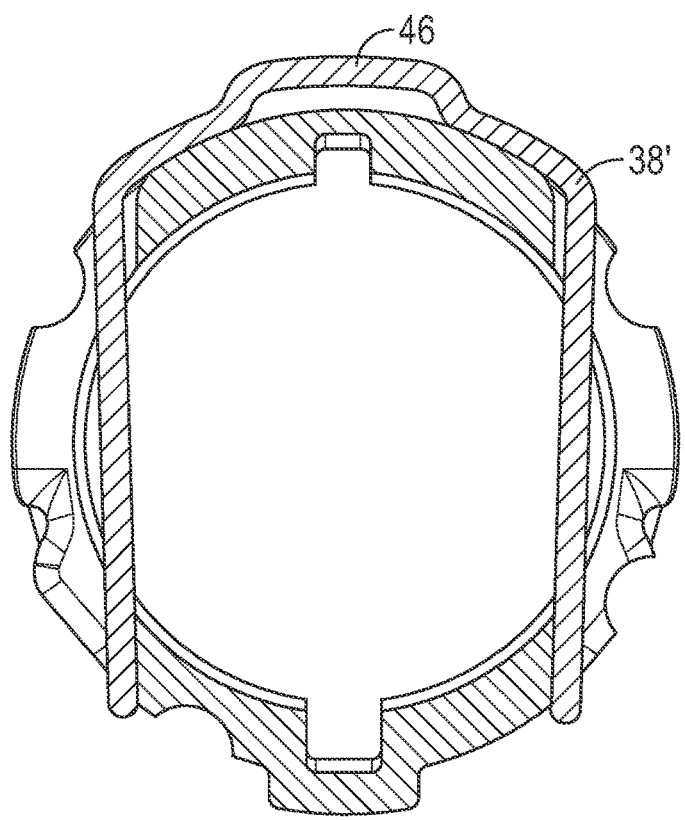
FIG. 6 is a cross-sectional view of a couple male-female assembly employing a metal retainer along a cutting plane perpendicular to the axis.

FIG. 6 shows an alternative metal (e.g., steel) retainer 38' that has a yoke 46 that can be pulled radially outwardly to facilitate separation of members 10 and 20.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A female quick connector member, comprising:
   a female connector body having an outer wall, the female connector body having an axial opening adapted to receive and lockingly engage a male connector member;
   indicia on the outer wall of the female connector body;
   a collar positioned over the outer surface of the female connector body for axial movement along the outer wall;
   a latch for holding the collar in a first position that at least partially conceals the indicia;
   a spring for urging the collar toward a second position exposing the indicia when the latch is released; and
   a release member extending from an interior wall of the axial opening, the release member engageable by a male connector member inserted into the axial opening, the release member configured to release the latch when the male connector member is lockingly engaged with the female connector member, whereby the spring urges the collar to the second position exposing the indicia;
   a radially deformable retainer located in a slot defined in the female connector body that is configured to deflect radially outwardly during insertion of the male connector member and rebound into a groove on the male connector member to lock the male and female connector members together; and
   wherein the latch is configured to cover and engage the retainer upon complete insertion of the male connector member into the female connector member to provide a secondary lock.

2. The connector member of claim 1, wherein the latch is a cantilevered section of the collar having a catch that projects into a radial opening through the wall of the female connector body before insertion of the male connector member.

3. The connector member of claim 1, wherein the spring is a coil spring, a leaf spring or a wave spring.

4. The connector member of claim 1, further comprising a retainer that deforms radially upon insertion of the male connector member and that holds the male connector member and female connector member together after complete insertion into the female connector member.

5. The connector member of claim 4, wherein the latch is a cantilevered section of the collar having a catch that projects into a radial opening through the wall of the female connector body before insertion of the male connector member.

6. The connector member of claim 1, wherein the release member is a pin extending through a radial opening in the wall of the female connector body, the release member having a proximal end projecting inwardly into the opening of the female connector body, the proximal end of the release member engageable with the male connector member upon complete insertion of the male connector member into the female connector, the release member having a distal end opposite the proximal end, the distal end engageable with the latch, whereby complete insertion of the male connector member into the female connector member causes release of the latch, and urging of the collar by the spring into the second position to expose the indicia.

7. The connector member of claim 1, wherein the female connector body has multiple indicia on the outer surface of the wall.

8. The connector member of claim 1, wherein the connector member has a plurality of latches for holding the collar in the first position.

9. The connector member of claim 1, wherein the connector member has a plurality of springs urging the collar toward the second position.

10. The connector member of claim 1, wherein the indicia includes a machine-readable code.

11. The connector member of claim 10, wherein the machine-readable code is a QR code or a bar code.

12. The connector member of claim 1, wherein the indicia includes words, numbers and/or symbols that can be read by a human.

\* \* \* \* \*